UNITED STATES PATENT OFFICE.

CARLETON ELLIS, OF MONTCLAIR, NEW JERSEY.

MANUFACTURE OF CATALYSTS FOR HYDROGENATION.

1,251,201.        Specification of Letters Patent.       Patented Dec. 25, 1917.

No Drawing. Original application filed March 29, 1912, Serial No. 686,988. Divided and application filed December 8, 1916, Serial No. 118,750. Divided and this application filed May 26, 1917. Serial No. 171,220.

*To all whom it may concern:*

Be it known that I, CARLETON ELLIS, a citizen of the United States, residing at Montclair, in the county of Essex and State of New Jersey, have invented certain new and useful Improvements in Manufacture of Catalysts for Hydrogenation, of which the following is a specification.

This present invention relates to the production of a catalyzer in a very finely divided state, suitable for hydrogenation of fatty materials such as fatty oils, including glycerids and fatty acids, wool grease, naphthalene, hydrocarbon oils or distillates containing unsaturated hydrocarbons such as olefins, resins, waxes, acid pitches, tars, asphaltic oils, malthas, rubber and the like. This application is a continuation of matter disclosed in my application 656100 filed Oct. 23, 1911, which matter is continued in my application 686,988, filed Mar. 29, 1912 (now Patents 1,026,156 and 1,217,118 respectively). (See also Serial No. 84,698 filed March 16, 1916, and 86,522 filed March 24, 1916). The present application is also a division of my copending application 118,750, which in turn is a division of Serial No. 686,988 above referred to.

The oil or other organic material to be treated, for example cottonseed oil or oleic acid may be passed through a tower or conduit, preferably of considerable length, in the form of a traveling stream, which progressively advances against a current of hydrogen or hydrogen-containing gas, as water gas. The fatty material may initially carry oil-soluble compounds of the catalytic metal, such as metallo-organic compounds soluble in oil, and in particular the oleates of the metals nickel, copper, iron, cobalt, chromium, manganese, titanium, molybdenum, vanadium and the like. These metals are hereinafter referred to as a "metal of the nickel type."

By heating the metallo-organic compounds, such as the oleates of these metals in the oil, and especially by regulating the temperature properly, these metallo-organic compounds may be decomposed in a predetermined manner, setting free the catalyst (that is to say the metal) not as a pulverulent catalyzer, but as an oil colloid, the metal existing therein in a state of almost infinite subdivision, perhaps approaching molecular condition, and colloidally carried in a state of quasi solution, wonderfully conducive to accelerated hydrogen absorption by the fatty or other organic material.

The temperature employed may be about 160–170° C., or more broadly stated, between for example 150 and 200° C., it being understood that temperatures are best employed, at which no considerable amount of undesirable decomposition of the oil or other organic material would be produced.

I do not specifically herein claim the decomposition of the oleates or similar compounds (which may be termed "potential catalysts," since by decomposition they liberate the metal in a highly catalytically reactive state) in the presence of the reducing gas such as hydrogen or water gas, such subject matter being claimed in my copending application 89,093 filed April 5, 1916.

The tower in which such illustrative treatment is effected in order to properly regulate the reactions may be filled or partially filled with a granular filling material (inert or catalytic). Throughout the process, care should be taken to avoid the presence of catalyzer poisons or substances which might cause a deterioration of the catalyzer. The oil vehicle in which the oleate or similar compound is to be decomposed, may if desired be the oil or other material which is to be subsequently hydrogenated by the use of the colloidal catalyst produced.

As above stated, the process is applicable broadly with the metals nickel, copper, iron, cobalt, chromium, manganese, titanium, molybdenum and vanadium and perhaps others, and has been found to be useful generally in connection with metals having an atomic weight between 48 (titanium) and 63.6 (copper). The process is of special utility in connection with the compounds of the metals nickel, iron and cobalt (atomic weights between 56 and 59).

What I claim is:

1. A process of making a catalytic material, which comprises heating a nickel salt of a carbon-containing acid, in an oily vehicle, sufficiently to decompose the said salt and to set free the catalyst.

2. A method of making a nickel catalyst which consist in subjecting a mixture of an oily vehicle and a reducible nickel salt of a substantially non-catalytic character, to non-oxidizing conditions, at a temperature sufficient to set free at least a material proportion of its nickel content, in a metallic state and in a highly catalytically active condition.

3. A process of making a nickel catalyst which comprises thermally decomposing, in an oil vehicle, a compound comprising nickel united to an organic radical.

4. A process which comprises thermally decomposing a nickel soap in an oil vehicle.

5. The process of making catalytic material adapted for hydrogenation of fatty oils, which comprises heating in an oily vehicle a finely divided organic salt of nickel.

6. A process which comprises the step of thermally decomposing a potential catalyst containing nickel in an oily vehicle.

7. A process of producing a catalyst from an intimate mixture of an oily vehicle and an oleate of a non-noble catalytic metal, which comprises thermally decomposing such oleate, within said vehicle, whereby the catalyst is set free in a colloidal condition within said vehicle, and intimately mixed therewith.

8. A process of making a finely divided non-noble metal catalyst which comprises thermally decomposing, in a body of oil, at a temperature above 150° C., an oleate of a metal having an atomic weight between 48 and 63.6, whereby the catalyst is set free in an extremely finely divided condition, and in a highly catalytically active state, within the oil which is capable of acting as a sealing agent.

9. The process of making a catalyzer consisting in dissolving an oleate of a hydrogenating metal catalyst in an oil and then decomposing such oleate in such oil.

10. A process which comprises the step of thermally decomposing a potential catalyst comprising a metal oleate in an oily vehicle.

11. The herein described process which comprises dissolving a soap of a metal in an oil, such metal in the free state being capable of acting as a hydrogenating catalyst, and then thermally decomposing such soap in such oil and liberating free metal in such decomposition.

12. A process of making a catalyst which comprises heating a mixture comprising an oil other than a readily drying oil, carrying mixed therewith a carbon-containing, readily reducible salt of a catalytic metal having an atomic weight between 48 and 63.6 to a temperature sufficient to decompose the said salt and to set free the catalyst in a very finely divided state in which it is highly active, within the body of the oil.

13. The process of making a mixture specifically adapted for use in the hydrogenation of unsaturated fatty material which comprises heating a mixture comprising a suitable organic vehicle carrying a readily reducible compound containing carbon, oxygen and a catalytic metal having an atomic weight between 48 and 63.6, said vehicle being incapable of preventing the formation of free metal catalyst, to a temperature sufficient to decompose said compound and to set free catalytic metal in a very finely divided state, in which condition it is highly active as a hydrogen carrier to unsaturated fatty material.

14. The process of making a catalyst which comprises thermally decomposing in a substantially fixed oily vehicle, which vehicle is liquid at the temperature of the reaction, a substantially non-catalytic salt containing a non-precious metal, said salt being without chemical action on said vehicle, and being thereby decomposed with the production of free catalytic metal capable of serving as an active catalyst in the hydrogenation of fatty oil.

15. A process of making a catalyst which comprises thermally decomposing, with the liberation of free metal, in an oil vehicle, a compound comprising a metal having an atomic weight between 48 and 63.6 united to an organic radical, said compound being inert to said vehicle.

16. A process of making a catalyzer adapted for use in hydrogenation of unsaturated fatty bodies, which comprises decomposing a substantially non-catalytic metal-containing material while dissolved in a liquid oily vehicle, incapable under the stated conditions, of producing a varnish, whereby a finely divided partly colloidal catalytic body is produced.

17. In the production of a catalyst suitable for use in hydrogenating oils, the step of subjecting an oil-soluble carbon-containing compound of a catalytic metal, in a state of admixture with an oil other than a readily drying oil, to decomposition at an elevated temperature.

18. A process of making a non-precious metal catalyst, which comprises thermally decomposing, in a non-oxidizing environment, while carried in a bath composed of an organic vehicle, which vehicle is liquid at the temperature of the reaction and is incapable of preventing the formation of free metal catalyst, a substantially non-catalytic compound containing such a non-precious metal united to a carbon-containing radical, such compound being thereby decomposed with the production of free non-precious metal in a highly catalytically active state within said bath, the vehicle protecting the metal catalyst from atmospheric influences.

19. The process of making a catalyzer comprising the step of decomposing, with the liberation of free metal, a substantially non-catalytic base-metal-containing-material while carried in a substantially inert liquid vehicle, whereby a colloidal metallic catalytic material adapted to serve as a hydrogen carrier for saturating the unsaturated components of fatty materials is produced.

20. A process of making a catalyzer which comprises dissolving an unstable compound of a hydrogenating catalytic metal and a carbon-containing radical in an oily vehicle, and setting free the metal in a substantially colloidal metallic condition while in such vehicle.

21. A process of making a catalyst which comprises heating a mixture comprising a carbon-containing, readily reducible compound of a catalytic metal having an atomic weight between 56 and 59, united to a carbon-containing radical, carried in an oil, to a temperature sufficient to decompose the said compound and to set free the catalyst in a very finely divided metallic state in which it is highly active, within the body of the oil.

22. In the preparation of catalysts, the step of subjecting a salt of a metal suitable for use as a hydrogenating catalyst with an organic acid, while carried in a bath of oil to heat under conditions capable of setting free the catalyst in an extremely finely divided metallic state.

23. In the production of a catalyst suitable for use in hydrogenating oils, the step of subjecting an oil-soluble carbon-containing compound of a catalytic material, in a state of admixture with an oily vehicle, to decomposition at an elevated temperature, said vehicle being incapable of preventing the formation of free metal by such decomposition.

In testimony whereof I affix my signature.

CARLETON ELLIS.